G. I. Washburn,
Gear Wheel and Pulley.

N° 41,896. Patented March 8, 1864.

Witnesses:
D. Schüttin
Charles Du Bois

Inventor:
Geo. I. Washburn
By Munn & Co
Attys

UNITED STATES PATENT OFFICE.

GEORGE I. WASHBURN, OF WORCESTER, MASSACHUSETTS.

IMPROVEMENT IN GEAR WHEELS AND PULLEYS.

Specification forming part of Letters Patent No. 41,896, dated March 8, 1864.

*To all whom it may concern:*

Be it known that I, GEORGE I. WASHBURN, of the city and county of Worcester, and State of Massachusetts, have invented a certain new and useful Improvement in Gear Wheels and Pulleys; and I do hereby declare the following to be a full and exact description of the same, reference being had to the accompanying drawings, making part of this specification, in which—

Figure 1:
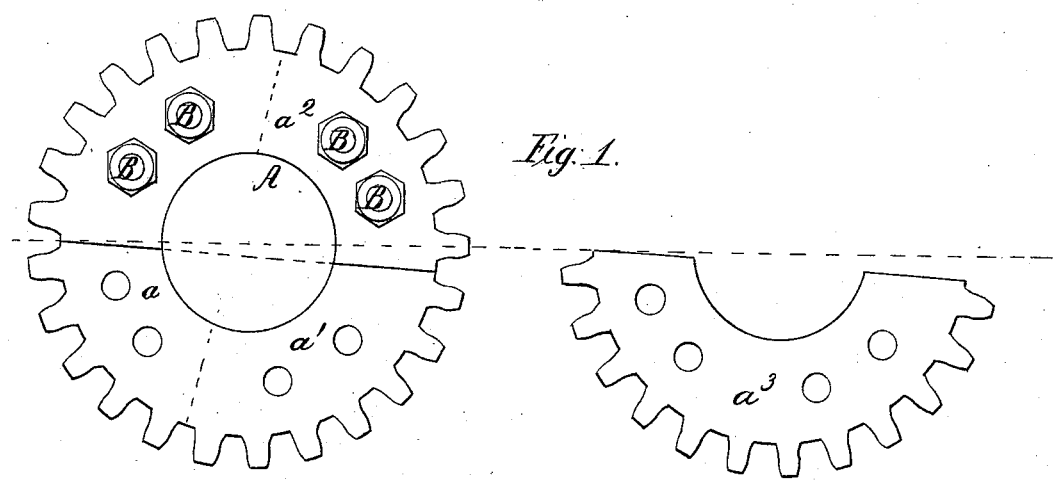
Figure 2:
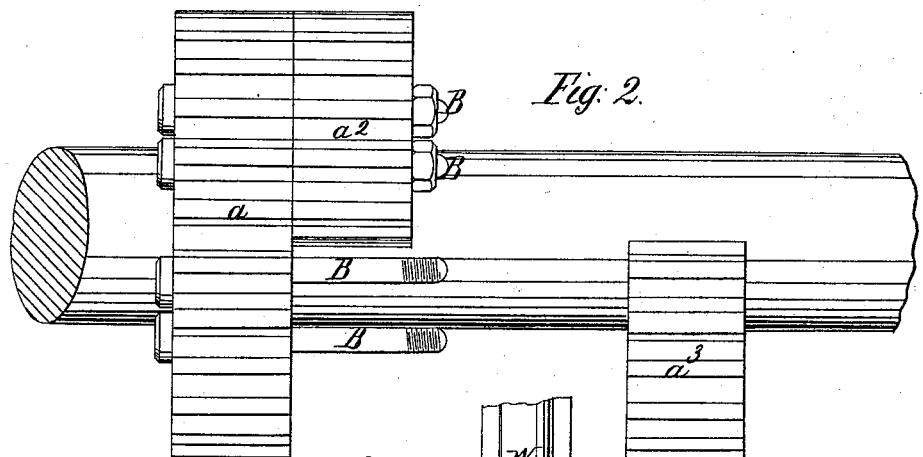
Figure 3:
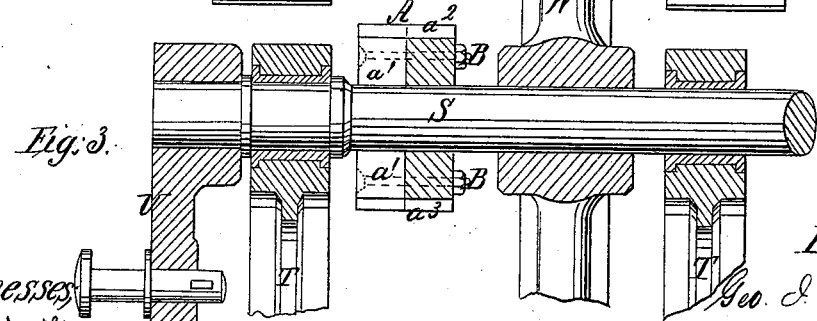

Figure 1 is an end view of a four-part wheel, three of the parts being in position and one detached. Fig. 2 is a side elevation of the same. Fig. 3 is a sectional elevation on a smaller scale, representing the said wheel applied to a shaft.

Similar letters of reference indicate corresponding parts in the several views.

The subject of my said invention is a compound gear wheel or pulley formed in two or more parts, adapted by their peculiar construction to be passed around a shaft and firmly secured thereon without slipping over the end thereof.

In order that others skilled in the art to which my invention appertains may be enabled to fully understand and use the same, I will proceed to describe its construction and operation.

In its simple form my improved gear wheel or pulley A may consist of four pieces, $a$ $a'$ $a^2$ $a^3$, of similar shape, as illustrated in the accompanying drawings. By forming the parts of the wheel of this peculiar shape it will be seen that it may be clasped around a shaft (without requiring to be slipped over the end thereof) and secured by bolts B B, or other suitable means. When thus placed upon the shaft, no joint extends completely through the wheel, in any part, and the most efficient and convenient means are afforded for applying bolts to secure the parts together.

In illustration of the value of this invention I will proceed to describe an arrangement of machinery for which it was originally contrived.

S represents an eleven-inch shaft supported in pedestal-bearings T T', and carrying a fly-wheel, W, twenty feet in diameter.

U represents the crank, by means of which rotation is communicated to the shaft S from a three-hundred-horse-power steam-engine.

A represents a gear-wheel about sixteen inches thick, which it was required to mount upon the shaft S in a space about nineteen inches wide, between the bearing T and the fly-wheel W.

Now, it will be apparent that to apply a wheel of the ordinary construction to a shaft in this position it would be necessary, each time the said wheel was put on or taken off, to first remove the crank U, and, secondly, raise the shaft S and fly-wheel W to a sufficient height to enable the wheel A to pass over the bearing T, whereas by my invention the wheel A may be placed in position or taken off with the utmost facility without disturbing the shaft or crank or any other part of the machinery.

Much time and labor are thereby saved on every occasion where it becomes necessary to repair or replace the said wheel. It will also be apparent that by countersinking the bolt heads and nuts the improved compound gear-wheel may be made to occupy no more space longitudinally of the shaft than the common solid wheel.

I do not limit myself to any number of parts or to the precise form of the parts of my wheel.

The essential peculiarity of the invention is that each member, while constituting a part of the body of a wheel of customary external form, performs the office of a clamp to hold the parts together.

Any variety of teeth and of bolts may be used, and the invention may also in some cases be applied to pulleys.

I am aware that wooden pulleys have long been made of a number of pieces of board attached together with glue, or other means, in such relative positions as to break joints and present the grain in all directions, so as to impart the necessary strength. My invention is confined to metal wheels, which have essentially different requirements, and from their nature are manifestly incapable of being constructed in a similar manner to the wooden pulleys referred to.

Having thus described my invention, what I claim as new, and desire to secure by Letters Patent, is—

A compound wheel constructed of metal, substantially as herein shown and described, so that each member, while forming part of the body of the wheel, will also constitute a clamp to hold the parts together.

GEO. I. WASHBURN.

Witnesses:
W. S. DAVIS,
EDWARD MELLEN.